(12) United States Patent
de Salis et al.

(10) Patent No.: US 7,556,133 B2
(45) Date of Patent: Jul. 7, 2009

(54) PRESSURE CONTROLLED CLUTCH PEAK TORQUE LIMITER

(75) Inventors: Rupert de Salis, Brentwood (GB); Nathan Saville, Essex (GB); Andrew Thomson, Brentwood (GB); Joe Slocombe, Chelmsford (GB); Alistair Hunt, Purfleet (GB)

(73) Assignee: Ford Global Technologies, LLC, Dearborn, MI (US)

( * ) Notice: Subject to any disclaimer, the term of this patent is extended or adjusted under 35 U.S.C. 154(b) by 327 days.

(21) Appl. No.: 11/459,739

(22) Filed: Jul. 25, 2006

(65) Prior Publication Data
US 2007/0175727 A1 Aug. 2, 2007

(30) Foreign Application Priority Data
Jul. 26, 2005 (GB) .................................. 0515252.5

(51) Int. Cl.
*F16D 25/12* (2006.01)
(52) U.S. Cl. ..................... 192/56.3; 60/591; 192/109 F
(58) Field of Classification Search ................ 192/52.1, 192/52.4; 60/591
See application file for complete search history.

(56) References Cited

U.S. PATENT DOCUMENTS

| 4,138,929 | A | 2/1979 | Peterson |
| 6,546,727 | B2 * | 4/2003 | Bockling et al. .............. 60/591 |
| 2004/0000341 | A1 | 1/2004 | Kim |
| 2004/0144349 | A1 * | 7/2004 | Wampula et al. ....... 123/90.038 |

* cited by examiner

*Primary Examiner*—Rodney H Bonck
(74) *Attorney, Agent, or Firm*—David B. Kelley

(57) ABSTRACT

A clutch peak torque limiter for regulating the flow rate of fluid between a clutch master cylinder and slave cylinder in a vehicle transmission, the valve having a non-return valve for allowing free flow of fluid from the clutch master cylinder to the clutch slave cylinder, a return orifice for allowing return flow of fluid from the slave cylinder to the master cylinder, and a pressure controlled valve in parallel with the non-return valve and return orifice for allowing flow of fluid between the slave cylinder and the master cylinder, the valve opening when the pressure on either side of the pressure controlled valve exceeds a predetermined level.

5 Claims, 2 Drawing Sheets

PRESSURE CONTROLLED CLUTCH PEAK TORQUE LIMITER

FIELD OF THE INVENTION

This invention relates to vehicle transmission systems and more particularly to reducing the torque shock experienced by vehicle components.

BACKGROUND OF THE INVENTION

In vehicles having conventional manual transmissions, when moving away from rest, some skill is required from the driver to maintain suitable engine speed while applying useful motive power to the wheels. If the clutch is released too quickly, the engine can be stalled, requiring a re-start. Other error states can include noisy over-revving of the engine, rough and jerky motion, or failure to achieve the desired vehicle position or rate of acceleration. These problems can generally be overcome with skill and experience, but they dissatisfy less skilled drivers and those encountering a different vehicle for the first time.

A second problem arises in that rapid clutch engagement on pull-away, engine bump start or bad gear changing, result in excessive stresses on transmission, driveline and suspension components. These can therefore be made cheaper and lighter if this effect can be reduced.

The root cause is that for a short time after the clutch is released, the speeds of the drivetrain and wheels are not yet synchronised with the engine. The full "slip torque" of the friction clutch, with its full clamp pressure, is transmitted through the above components, regardless of engine torque or tyre friction. This slip torque is typically from 1.3 to 3 times the highest output torque that the engine can deliver in steady state operation. The clutch slip torque and the gear ratios etc. are the only significant factors controlling the resulting peak torque, unless the actuation system can slow the engagement of the clutch.

These problems are worsened by current trends towards higher clutch slip torque, making the error states more difficult to avoid.

A known attempt at mitigating the above problem employs a non-return valve that allows free flow of fluid from the clutch master cylinder to the clutch slave cylinder. This flow causes the clutch to be disengaged. A small orifice is combined in the same device, to allow return flow of fluid from the slave cylinder to the master cylinder, but at a slow rate, when the clutch pedal is released to re-engage the clutch. This flow is deliberately slowed to slow the engagement of the clutch, reducing the peak torques arising on clutch engagement.

Typically the orifice is required to make little or no difference to normal driving events, but only to restrict the fierceness of unusually sudden engagements. However these effects are difficult to achieve at both low and high temperatures.

The above solution can increase the clutch pedal return time to an unacceptable degree. The controllability is most severely affected in cold temperatures, owing to raised viscosity of the fluid. These limiters can therefore only provide limited control, which does not provide an acceptable solution to the main problem, and only limited relief for the second highlighted problem.

SUMMARY OF THE INVENTION

With a view to mitigating the above disadvantages, the present invention provides a clutch peak torque limiter for regulating the flow rate of fluid between a clutch master cylinder and slave cylinder in a vehicle transmission, the limiter having a non return valve for allowing free flow of fluid from the clutch master cylinder to the clutch slave cylinder and a return orifice for allowing return flow of fluid from the slave cylinder to the master cylinder, characterised by a pressure controlled valve in parallel with the non-return valve and the return orifice for allowing flow of fluid between the slave cylinder and the master cylinder, the valve opening when the pressure on either side of the pressure controlled valve exceeds a predetermined level.

Advantageously, the torque limiter comprises a body containing the non-return valve and the return orifice.

The body may be sealed at one end by the pressure controlled valve.

The body may be made from an injection moulded plastics material.

Preferably, the non-return valve is a perforated bypass tube surrounded by a flexible sleeve. The tube is advantageously made from machined steel and the sleeve from injection moulded silicone rubber.

Likewise, the pressure controlled valve may be advantageously made of injection moulded silicone rubber.

The purpose of the invention is to allow rapid return of fluid from the slave cylinder to the master cylinder on release of the actuation system, until the clutch begins to engage. At this point the invention prevents the fluid pressure, at the slave cylinder, from being completely released immediately. The pressure is maintained at an intermediate level, high enough to reduce the slip torque of the clutch, but low enough to allow useful drive torque to be transmitted. This condition persists for a suitable period of time, after which the pressure is fully released and the slave cylinder completely ceases its effect on the clutch.

By allowing rapid disengagement for most of the required travel of the clutch, the invention allows the total recovery time of the system to be reduced to acceptable levels, yet still ensures a significantly slower rate of engagement at the end of the travel.

This creates a gentle engagement of the clutch pedal, even upon rapid release of the actuating system. This results in the vehicle being very easy to drive and almost impossible to stall. The vehicle components are further not subjected to the high stresses typically resulting from rapid clutch engagement regardless of the temperature of the clutch fluid.

BRIEF DESCRIPTION OF THE DRAWING

The invention will now be described further by way of example with reference to the accompanying drawings in which.

DETAILED DESCRIPTION OF THE INVENTION

Figure 1:
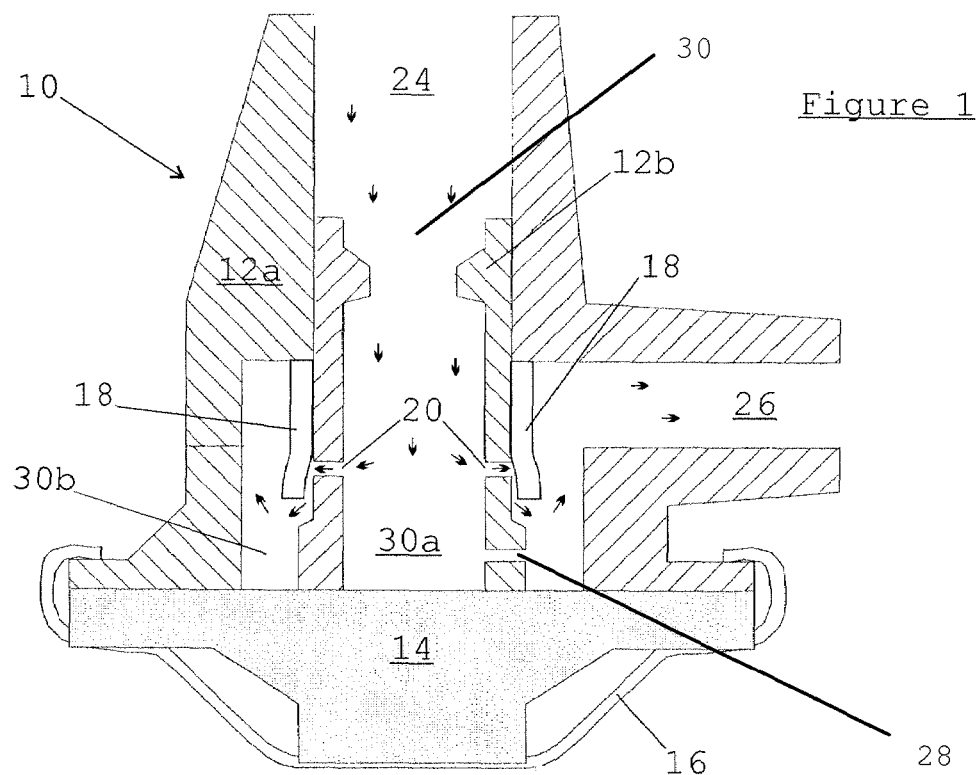
FIG. 1 shows a section of a torque peak limiter with the fluid flow path at the beginning of the clutch pedal disengagement stroke.

FIGS. 1-4 show a section through a torque limiter. The torque limiter is intended to be installed in the fluid flow path between the clutch master cylinder and slave cylinder of an automotive transmission.

The limiter 10 comprises a body 12a made from an injection moulded plastics material.

The body 12a includes a master cylinder port 24 in communication with the clutch master cylinder and a slave cylinder port 26 in communication with the slave cylinder. The master cylinder port opens into an axial end of a cylindrical chamber 30, which in turn communicates radially with the slave cylinder port. The chamber 30 is sealed at its other axial end by an injection moulded silicone rubber diaphragm 14 that is clamped to the body by a cap 16.

The shape and size of the master cylinder port 24 allows for the insertion of a fluid bypass tube 12b. The tube 12b divides chamber 30 into an inner chamber 30a and an outer annular region 30b.

When installed in the body 12a, the end of bypass tube 12b distant from master cylinder port 24, abuts and seals against the surface of diaphragm 14.

Bypass tube 12b includes forward flow orifices 20 in the form of radial holes drilled in the circumference of the bypass tube. A valve sleeve 18 is provided over the outer circumference of the bypass tube 12b where the tube protrudes into the chamber 30 inside the body 12a. The valve sleeve is made from an injection moulded silicone rubber and serves to block the forward flow orifices 20. The combination of the forward flow orifices 20 and the valve sleeve 18 create a one way valve biased to allow fluid to flow from the inner chamber 30a into the outer annular region 30b and on to the slave cylinder port 26.

Bypass tube 12b also includes a further hole or reverse flow leak-down orifice 28, between the inner chamber 30a and the outer annular region 30b.

FIG. 1 shows the fluid flow path at the beginning of the clutch pedal disengagement stroke. Pressure on the clutch pedal causes a slight rise in fluid pressure in the master cylinder and fluid to pass into the body 12a through master cylinder port 24. Fluid passes through the bypass tube 12b and emerges through the forward flow orifices 20, deflecting the valve sleeve 18 slightly to create a flow path. The fluid then passes out through the slave cylinder port 26 to the slave cylinder.

Figure 2:
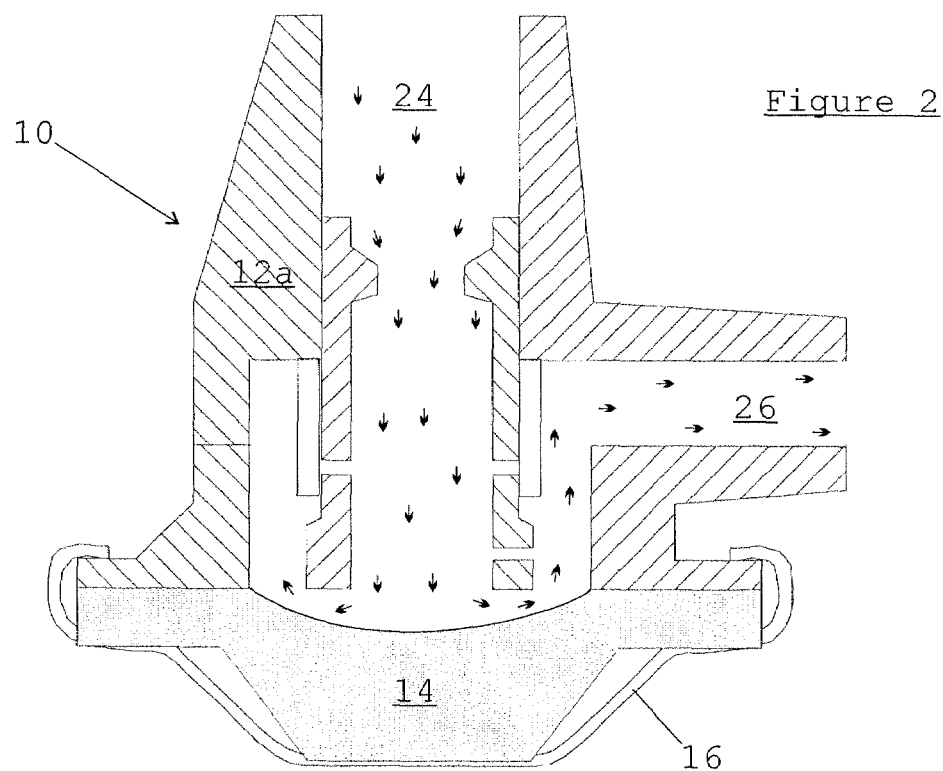
FIG. 2 shows a section of a torque peak limited as the disengagement stroke proceeds and the pressure rises.

As the disengagement stroke proceeds and the pressure rises further, the diaphragm 14 is compressed and deflected downwards as shown in FIG. 2. This causes it to lose contact with the bypass tube 12b and opens a further flow between inner chamber 30a and outer annular region 30b. This serves no purpose during the disengagement stroke, but prepares the diaphragm for the return stroke.

Figure 3:
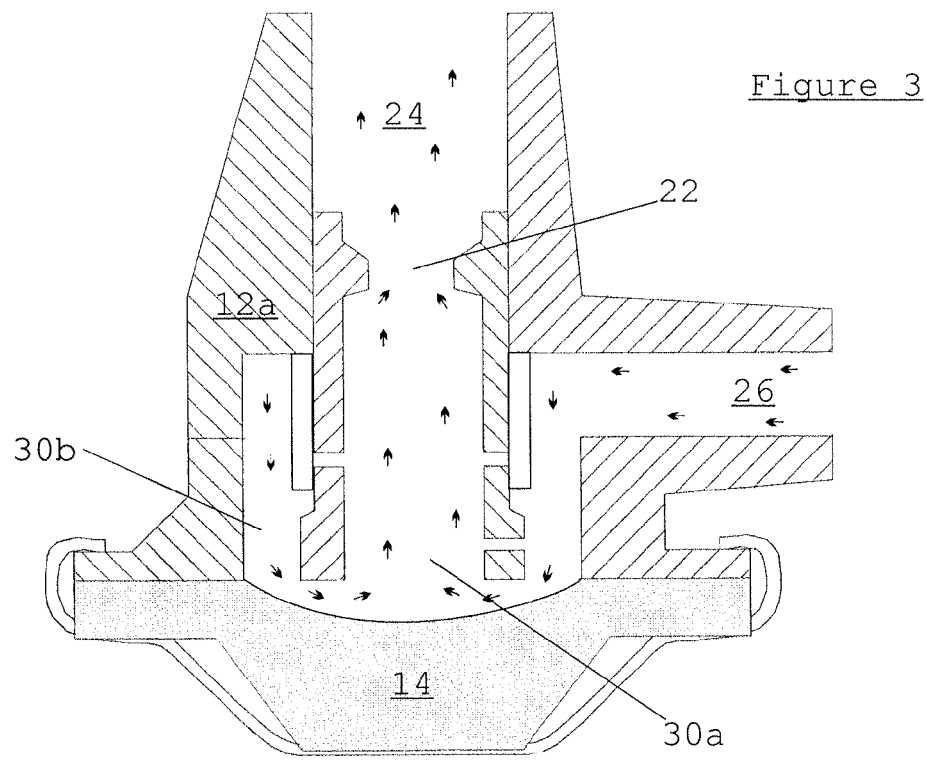
FIG. 3 shows a section of a torque peak limiter at the beginning of the re-engagement stroke.

In FIG. 3, at the beginning of the re-engagement stroke, there is a slight reduction in pressure as the pedal is moved, and clutch fluid passes into the slave cylinder port 26 from the slave cylinder. The reverse flow pressure orifice 22 serves as a restriction in the flow path downstream of the diaphragm 14. By restricting the flow out of the limiter 10, the pressure at the diaphragm 14 remains high enough to maintain the deflection of the diaphragm 14. The fluid can therefore pass through the gap between the diaphragm 14 and the bypass tube 12. This gives a free path back to the master cylinder via the master cylinder port 24.

As the re-engagement stroke proceeds, the pressure remains high. In the event that the pedal is completely released ("side-stepped"), the pressure within the body 12a remains high, because the reverse flow pressure orifice 22 restricts the flow path. As a result, the diaphragm 14 remains deflected, and the gap is maintained with the end of the bypass tube 12b. This allows fluid to flow through the torque limiter 10 from port 26 to port 24, allowing the clutch to re-engage.

Figure 4:
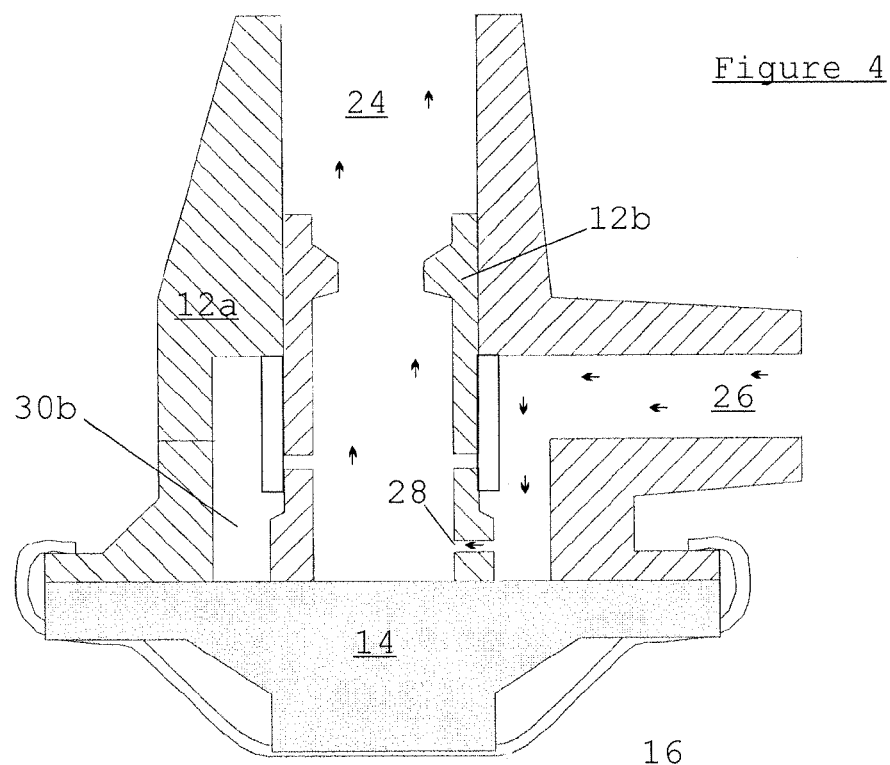
FIG. 4 shows the flow path when the clutch starts to re-engage.

FIG. 4 shows the flow path when the clutch starts to re-engage. The clutch sliding surfaces begin to take up the load of the clamp springs, causing the pressure at the slave cylinder, and hence at port 26 to drop. This drop in pressure is transmitted through the torque limiter 10, causing the diaphragm 14 to recover from its deflection, and close tightly against the bypass tube 12b. At this point, the clutch pedal will have moved almost or completely back to its rest position.

As the clutch continues to re-engage, the remaining fluid motion must take place through the reverse flow leak-down orifice 28, as the other two pathways are now blocked. This fluid motion brings the fluid pressure at the slave cylinder slowly down to zero (gauge pressure), its desired rest condition. During this time (typically 0.1 to 1 second), the clutch is prevented from engaging with its full clamp force. This is because the clamp force is reduced by the lingering action of the fluid pressure on the slave cylinder. This allows the clutch to slip if required, while the transmission and engine speeds become synchronised.

As a result, the engagement event, while not significantly slowed or delayed, is "softened" in its final stage, reducing the occurrence of excessive driveline forces, and making it easier to engage the clutch without stalling the engine.

The invention claimed is:

1. A clutch peak torque limiter for regulating the flow rate of fluid between a clutch master cylinder and slave cylinder in a vehicle transmission, the limiter having;
    a body;
    a non-return valve in the body for allowing free flow of fluid from the clutch master cylinder to the clutch slave cylinder;
    a return orifice in the body for allowing return flow of fluid from the slave cylinder to the master cylinder; and
    a pressure controlled valve in parallel with the non-return valve and return orifice for allowing flow of fluid between the slave cylinder and the master cylinder, the valve opening when the pressure on either side of the pressure controlled valve exceeds a predetermined level, the pressure controlled valve sealing one end of the body.

2. A torque limiter as claimed in claim 1 wherein the body is made from an injection moulded plastics material.

3. A torque limiter as claimed in claim 1 wherein the non-return valve is a perforated bypass tube surrounded by a flexible sleeve.

4. A torque limiter as claimed in claim 3 wherein the perforated tube is made of machined steel and the sleeve of injection moulded silicone rubber.

5. A torque limiter as claimed in claim 1 wherein the pressure controlled valve is made of injection moulded silicone rubber.

* * * * *